Aug. 31, 1926.
A. P. BRUSH
1,598,421
CARBURETOR
Filed Dec. 5, 1921
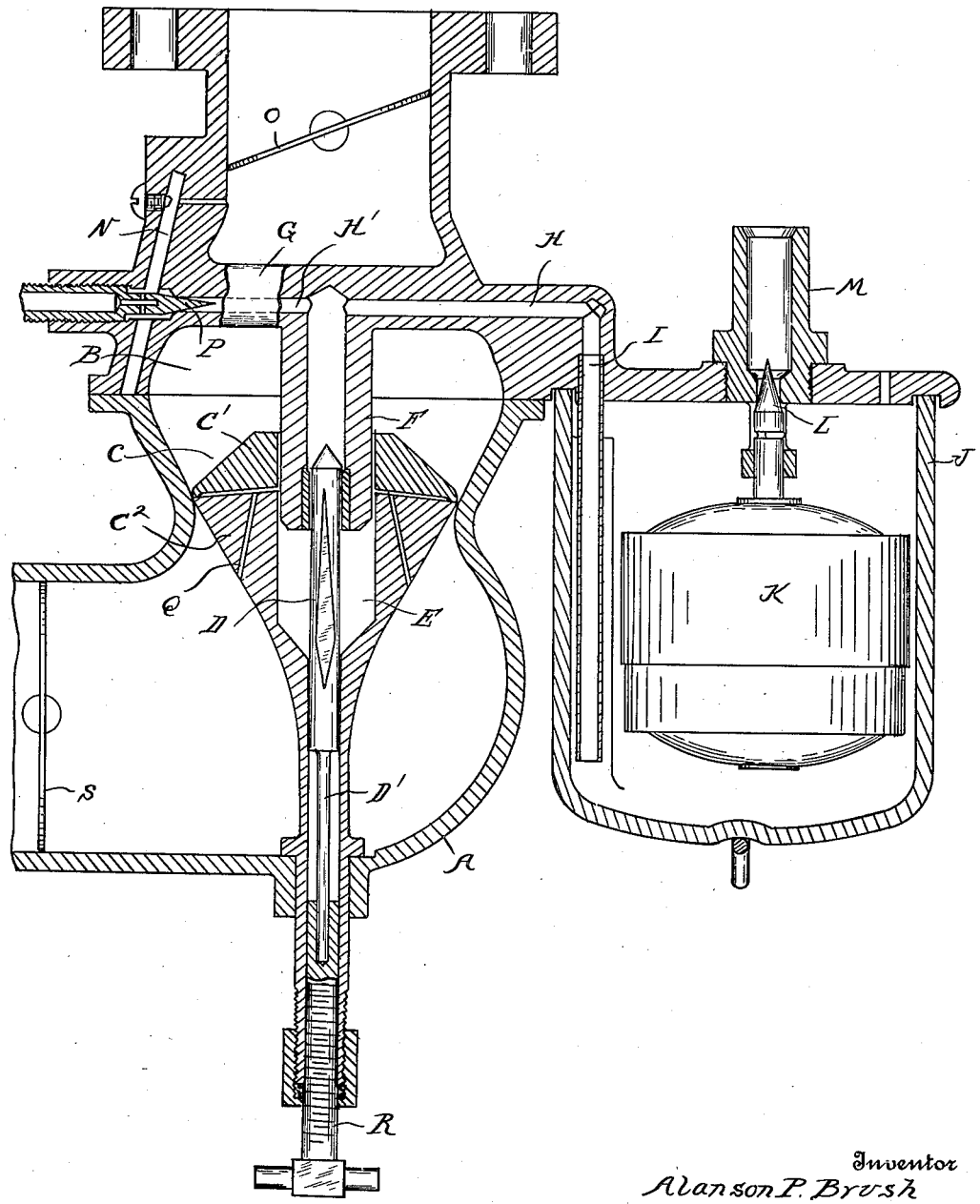
Inventor
Alanson P. Brush
By Whittemore Hulbert Whittemore
+ Belknap          Attorneys Patented Aug. 31, 1926.

1,598,421

UNITED STATES PATENT OFFICE.

ALANSON P. BRUSH, OF DETROIT, MICHIGAN.

CARBURETOR.

Application filed December 5, 1921. Serial No. 519,906.

The invention relates to carburetors of that type in which the flow of the liquid fuel is controlled by a gravity seated air valve, which also forms, as it rises and falls, an expanding and contracting Venturi passage. With certain constructions of carburetor of this type the rise of the air valve has been retarded by a liquid dash-pot, usually formed in a chamber which is intermediate the source of fuel and the fuel feed passage. Also, constructions have been devised in which the dash-pot operates only in one direction, viz., to retard the rise, while in the reverse direction of movement a by-pass is opened, permitting the quick descent of the valve.

One of the features of the present invention is a construction in which the dash-pot is formed by a chamber arranged beyond or on the discharge side of the metering restriction, where on the rise of the valve the contents of the dash pot is displaced into the mixing chamber. Also, the construction is such that the dash pot operates only in one direction, but without the necessity of any by-pass, inasmuch as air may be freely admitted thereto upon the falling of the valve. This has advantages which will be hereinafter set forth.

It is another object of the invention to provide means for counteracting the tendency, which most carburetors of the general type have, of gaining in richness of mixture after the air valve has attained the limit of its upward movement. This is accomplished by a construction in which the suction for discharging the fuel through the feed orifice is varied and, particularly, in which it is reduced as the air valve approaches its limit of upward movement. Various other features of my improved construction will be more fully described hereinafter.

In the drawing, I have represented my improved carburetor in vertical central section.

A is the outer casing which is provided with a double tapered mixing chamber B. C is an air valve seated in the lower portion of this mixing chamber and being of a double tapered form to form the complementary wall of the expanding venturi. The valve C controls a fuel valve D which is arranged axially thereof in a recess E therein. The valve D cooperates with a stationary fuel supply conduit F, which depends from a cross arm G within the casing and which constitutes a plunger loosely fitting the recess E. Fuel is supplied to the conduit F through a passage H in the cross arm connecting with a depending conduit I, which extends to near the bottom of the float chamber J and a float K within this chamber actuates the valve L, controlling the fuel supply conduit M. An extension H' of the passage H connecting with a passage N forms an auxiliary fuel discharge into the air stream at a point adjacent to the location of the throttle valve O and the flow through this auxiliary passage is regulated by a valve P.

With the construction as thus far described, the variable air flow in the mixing chamber caused by different adjustments of the throttle valve will produce a correspondingly variable lifting of the air valve. This in turn will vary the restriction of the orifice controlled by the fuel valve and through which fuel passes from the conduit F into the chamber E. The fuel in the chamber E passes around the plunger formed by the conduit F and through a laterally extending passage to the periphery of the valve, where it is commingled with the air current at the point of greatest restriction of the venturi. The flow of the fuel is, however, accelerated upon a sudden opening of the throttle, due to the contraction of the chamber E, when the air valve rises, and the pressure upon the fluid therein, while at the same time this acts as a dash pot for retarding the lifting of the valve. On the other hand, when the throttle is moved towards closed position to decrease the air flow in the mixing chamber, the falling of the air valve will enlarge the chamber E and will retard or temporarily stop the discharge of fuel into the air current, while air is permitted to quickly enter the expanding chamber, diminishing any retarding effect to the descent of the valve.

As has been above referred to, one defect of carburetors of this type is that when the air valve has reached the upward limit of its movement, there is a tendency for the mixture to become over rich. This I have avoided by forming the air valve in two sections C' and $C^2$, which are independently movable and which are arranged upon opposite sides of the laterally extending passage from the chamber E to the periphery of the valve. I have further provided one or more air passages Q in the lower section of the valve, which permit the entrance of air from below at substantially atmospheric pressure into the space between the two sections, which will effect the lifting of the upper section in advance of the lower. As soon, however, as the upper section separates from the lower section, this air pressure between the same will be reduced by communication with the vacuum in the mixing chamber, which will cause the lifting of the lower section following the upper section. When the upper section has reached the limit of its upward movement, as by the stop formed by the cross member G, the lower section will continue to rise until by restricting the space between the same and the upper section, a balance of pressures is effected. Thus, the suction which operates to discharge the fuel is automatically regulated, which will prevent the enrichment of the mixture when the engine is running at high speed.

For setting the carburetor the fuel valve D is adjustable in relation to the valve C, as by means of the screw R engaging a threaded aperture in the valve stem and actuating a shank D′ of the fuel valve. A choke valve S may also be provided for controlling admission of air below the air valve.

With the construction as described, when the engine is idling, fuel may be supplied thereto through the auxiliary passage N which discharges adjacent to the throttle valve. Upon the opening of the throttle the valve C will rise, but not as a unit, the upper section C′ being first actuated and being followed by the lower section C². The liquid fuel which has passed the feed orifice and has accumulated in the chamber E will be forced outward through the clearance space around the plunger F and into the space between the upper and lower sections of the valve. This also retards the movement of the lower section, and consequently, retards the increase in volume of the air current, so that the inertia of the liquid fuel may be overcome and a substantially uniform mixture maintained. If the throttle is moved towards the closed position, the air valve will be dropped without retarding effect, for air will be drawn in between the plunger F and the valve, preventing the formation of a partial vacuum. Finally, as has been before stated, the suction which operates to draw the fuel through the feed orifice will be regulated by the relative movements of the upper and lower sections of the valve to avoid variation in the quality of the mixture.

By the term "fuel regulating means" as used in the claim, I mean what is commonly termed in the art a metering pin or equivalent device for varying the size of the restricted orifice through which the fuel passes.

The fuel is discharged into the mixing chamber through the space between the lower and upper sections of the air valve. Therefore, the discharge is most highly restricted when the two sections are in closest proximity, while the separation of said sections will remove restriction.

The lifting of the valve is accomplished by differential air pressure occasioned by the vacuum above and the substantial atmospheric pressure below. However, at the start the upper section of the valve completely shields the upper face of the lower section, and furthermore the air passages Q through the lower section will tend to equalize the pressures on the lower and upper faces of the lower section of the valve. Consequently there is no differential operating upon the lower section to lift the same, but there is a differential between the lower face and upper face of the upper section which will cause said upper section to rise.

When the upper section separates from the lower section, the air pressure between said sections is reduced. This is for the reason: first, that the enlarged opening at the periphery tends to communicate the vacuum of the mixing chamber to the space between the sections, and second, the air admission passages Q through the lower section being restricted in size cannot supply air fast enough to neutralize this vacuum. Therefore, there will be a differential pressure operating upon the lower section of the valve, which will cause it to also rise following the upper section. The distance between the upper and lower sections will thus be automatically regulated and this in turn will automatically regulate the discharge of the liquid fuel between said sections. When the upper section reaches the limit of its upward movement, the lower section is still permitted to rise until the shielding action of the upper section reduces the differential pressure and a condition of balance is attained. If, however, the speed of the motor is accelerated after the upper section is in its highest position, then the increased vacuum will cause a further rise of the lower section, further restricting the space between the sections and the discharge of liquid fuel therebetween. As a consequence the tendency of all carburetors to increase in richness after the air valve is fully opened will be counteracted in applicant's construction by the further restriction, due to the further rise of the lower section of the air valve.

What I claim as my invention is:

In a carburetor, the combination with a mixing chamber, of an automatic valve for controlling the admission of air thereto, said valve being formed of two independently movable sections with a fuel discharge passage therebetween communicating with said mixing chamber, fuel regulating means actuated by said valve controlling the flow of fuel to said passage, means for admitting air through the lower section of said valve from the atmospheric side thereof into said passage, whereby the upper section of said valve will be moved in advance of the lower section and the differential pressure effective at the regulating point will be automatically regulated, and a stop for limiting the rise of the upper section of the valve.

In testimony whereof I affix my signature.

ALANSON P. BRUSH.